April 15, 1941. J. E. HAINES 2,238,431
TEMPERATURE CONTROL SYSTEM
Filed Nov. 9, 1936
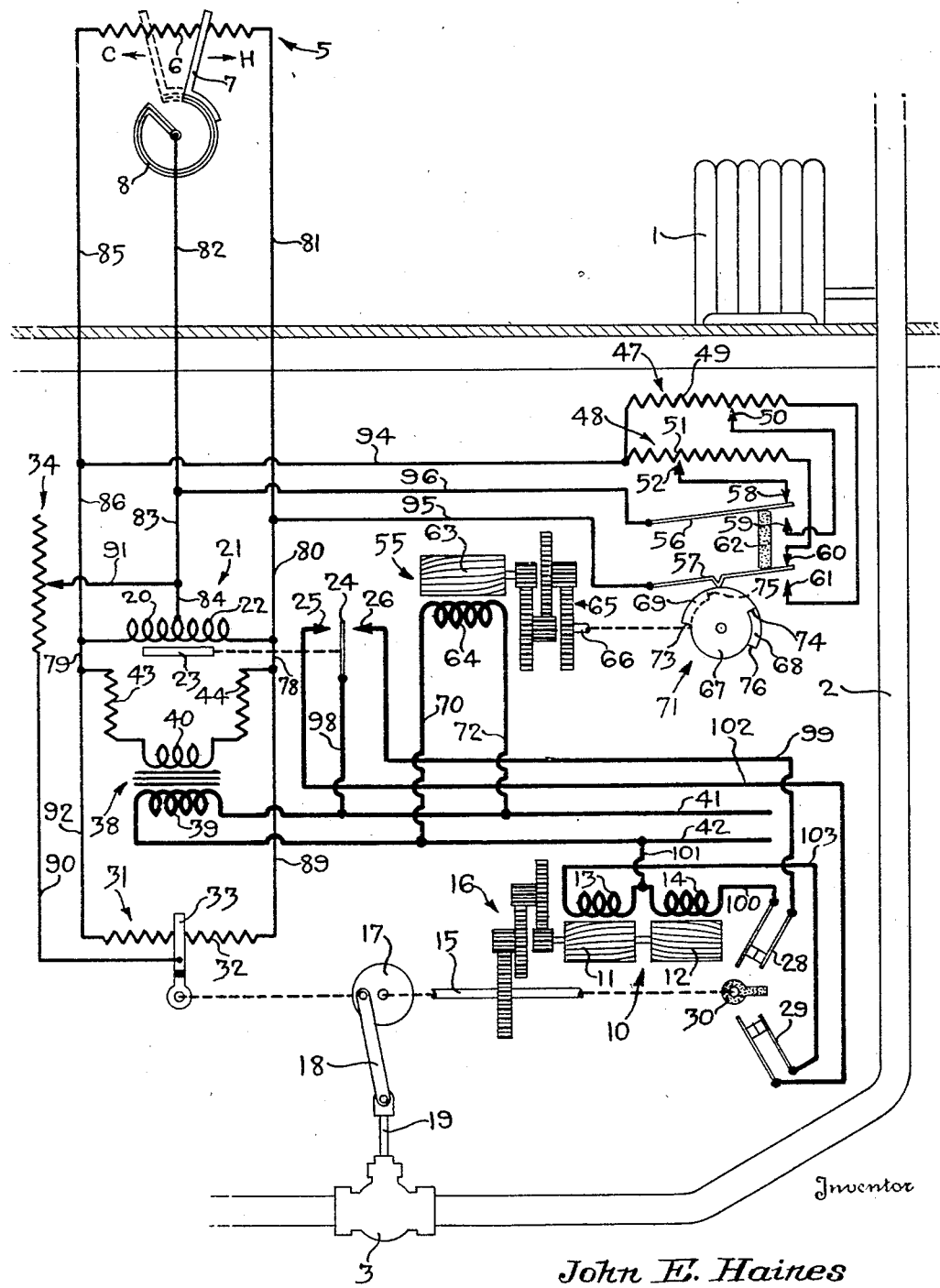
Inventor
John E. Haines
By George H Fisher
Attorney Patented Apr. 15, 1941

2,238,431

UNITED STATES PATENT OFFICE 2,238,431

TEMPERATURE CONTROL SYSTEM

John E. Haines, Minneapolis, Minn., assignor to Minneapolis-Honeywell Regulator Company, Minneapolis, Minn., a corporation of Delaware Application November 9, 1936, Serial No. 109,857

2 Claims. (Cl. 236—46)

My invention relates to a temperature control system, and more particularly to such a system wherein the temperature maintained is varied during a certain period of the day.

It is quite customary in certain types of temperature control systems to provide means for changing the temperature to be maintained during certain periods of the day. Probably the most common example is that of lowering the temperature during the night in the case of an on and off type of temperature control system. This type of control system is one wherein the temperature regulating means is maintained in either one of two extreme positions. Such lowering of the temperature maintained during the night in the case of an on and off system is commonly effected by a physical adjustment of the thermostat. The present invention is more particularly concerned with a type of control system wherein the position of the regulating device for the temperature changing means is variably positioned in accordance with the value of the controlling temperature.

An object of this invention is to provide a temperature control system of the type wherein the position of a regulating device for a temperature changing means is proportionally positioned in accordance with a controlling temperature and wherein the position of the regulating device relative to the temperature is altered during a predetermined portion of the day by means including a variable impedance and a timing device for varying said impedance.

A further object of this invention is to provide a condition control system wherein the operation of a condition varying means is controlled through a resistance varied in accordance with the value of the condition and wherein the effect thereof is periodically changed by a second resistance varied by a timing device.

A further object of this invention is to provide a motor control system employing three variable impedance means, one controlled by a condition responsive means, another by a timing device, and the third by the motor.

A further object of the present invention is to provide a motor control system of the type set forth in the previous object in which the impedance means controlled by the timing device consists of potentiometer means which are variably connected to the control impedance.

Further objects of the invention will be apparent from a consideration of the accompanying specification, claims and drawing.

In the drawing, the control system is shown as applied to one particular type of heating system although it is to be understood that the invention is not to be limited to any particular type of heating system and, as will be pointed out in detail later, in certain aspects is not even limited to a temperature control system. Referring in detail to the drawing, a radiator is designated by the reference numeral 1. This radiator is located in a space whose temperature is to be controlled, being supplied with steam through a pipe 2, the flow of steam through which is controlled by valve 3. While only one radiator has been shown, it is to be understood that any number of radiators can be employed, and the steam pipe 2 has been shown as extending beyond the radiator leading to other such radiators.

Located in some suitable controlling medium is a thermostatically operated control potentiometer 5. This control potentiometer is shown, for purposes of illustration, as being located in the same room as radiator 1, although it is to be understood that it need not be so located. The control potentiometer 5 comprises a resistance element 6 and a slidable contact arm 7. The contact arm 7 is actuated by a bimetal element 8, so that the contact arm is moved on resistance 6 in response to changes in temperature. As indicated by legends on the drawing, the contact arm 7 is moved to the right upon an increase in temperature, and to the left upon a decrease in temperature.

The control potentiometer 5 acts to control a motor 10 which, in turn, operates a valve 3. The motor 10 is of the reversible type and comprises two rotors, 11 and 12, which have associated therewith field windings 13 and 14, respectively. The motor 10 is connected to a shaft 15 through a reduction gearing 16. The shaft 15 has secured thereto a crank disc 17, and a lever 18 operatively connects crank disc 17 to the valve stem 19 of valve 3. The motor 10 is so connected to valve 3 that upon field winding 13 being energized, the valve is moved towards closed position. On the other hand, when field winding 14 is energized, the valve is moved towards open position.

A relay 21 controls the energization of motor 10. This relay comprises a relay winding which is tapped at its midpoint to form two relay coils, 20 and 22. Associated with the relay coils 20 and 22 is an armature 23 which is operatively connected with a switch arm 24. The switch arm 24 is adapted to be moved into engagement with either of two contacts, 25 and 26. The relay 21 is of the balanced type, and when relay coils 20 and 22 are equally energized the armature 23 is in its midposition and correspondingly switch arm 24 is in midposition, as shown in the drawing. Upon relay coil 22 being more highly energized than relay coil 20, the armature 23 is moved to the right, causing switch arm 24 to be moved into engagement with contact 26. Similarly, when the opposite condition exists, that is, when relay coil 20 is more highly energized than relay coil 22, the armature 23 is moved to the left, causing switch blade 24 to be moved into engagement with contact 25.

Also controlling the operation of motor 10 are two limit switches, 28 and 29. These switches are connected in series with the field windings 14 and 13, respectively, and are for the purpose of interrupting the operation of the motor upon the valve reaching either extreme position. An arm 30, preferably of insulating material, is secured to shaft 15 and is operative to engage one or the other of these limit switches and open the same upon the shaft reaching a position corresponding to the extreme position of the valve.

The control potentiometer 5 operates to unbalance the energization of the coils 20 and 22 of the relay 21, thus causing the motor to operate in one direction or another. In order to limit the motion of the motor and consequently of the valve to an amount corresponding to the movement from normal position of control potentiometer 5, a rebalancing potentiometer 31 is provided. This rebalancing potentiometer comprises a resistance 32 and a contact arm 33 slidable on the resistance. Contact arm 33 is secured to shaft 15 so as to be movable therewith. Upon the contact arm 7 of the control potentiometer 5 being moved in either direction, the resulting operation of the motor caused by the relay 21 being unbalanced causes the movement of contact arm 33 of rebalancing potentiometer 21 in a direction tending to rebalance the energization of relay coils 20 and 22. In order to render the control potentiometer less effective as compared with control potentiometer 5, for reasons which will be pointed out later, a rheostat 34 is placed in the connection of contact arm 33 to the relay coils 20 and 22.

A transformer 38 is employed to supply energy to the relay coils for operation of the relay. This transformer comprises a line voltage primary 39 and a low voltage secondary 40. The primary 39 is connected to line wires 41 and 42 leading to any suitable source of power (not shown). The secondary 40 is connected to the opposite terminals of the relay coils 20 and 22, and included in such connections are protective resistances 43 and 44.

The system which has been described so far, with the exception of rheostat 34, is of a more or less conventional type and the particular details thereof do not constitute part of the present invention. As is somewhat obvious from the previous description, and as will be explained in more detail later, this system functions upon the deviation of contact arm 7 of the control potentiometer 5 from its normal position to unbalance the relay 21 and cause a rotation of motor 10 in a direction such as to vary the position of valve 3 in a manner tending to restore the condition to its normal value. At the same time the operation of the motor is terminated by the action of a rebalancing potentiometer as soon as the motor has moved an amount corresponding to the temperature of control arm 7 from its previous position. As indicated earlier, the present invention is particularly concerned with providing means whereby the temperature to be maintained may be automatically changed during certain portions of the day. Further, as indicated previously, this is accomplished in the present invention by variable impedance means which are varied by a timing device.

The reference numerals 47 and 48 are used to designate two potentiometers, which potentiometers, by reason of the fact that they vary the action of control potentiometer 5, may be termed compensating potentiometers. Potentiometer 47 comprises a resistance 49 and a contact 50. Potentiometer 48 comprises a resistance 51 and a contact 52. It will be noted that contacts 50 and 52 are differently adjusted with respect to their associated resistances. The two potentiometers 47 and 48 constitute the variable impedance means referred to in the preceding paragraph.

A time switch functions to connect either potentiometer 47 or potentiometer 48 in parallel with control potentiometer 5. The switch portion proper of the time switch comprises two switch blades, 56 and 57. Switch blade 56 is adapted to cooperate with contacts 58 and 59, and switch blade 57 with contacts 60 and 61. A block 62 of insulating material is secured between these two switch blades and is effective to cause any motion imparted to switch blade 57 to be transmitted to switch blade 56. A synchronous motor 55 comprising motor 63 and a field winding 64 is employed to operate the switch. The field winding 64 of the motor is connected through conductors 70 and 72 with line wires 41 and 42. The motor is connected through a reduction gear train 65 with a shaft 66, upon which is secured a cam 71 consisting of cam members 67 and 68. Cam member 67 is superimposed upon cam member 68 and has an elongated arcuate projecting portion which corresponds to a similar projecting portion on cam 68. The two projecting portions of these cam members form a continuous projecting cam surface which is designated by the reference numeral 69. As will be noted from the drawing, the projecting surface of cam 67 extends from the shoulder 73 to the shoulder 74, while the projecting portion of cam 68 extends from the shoulder shown in dotted lines and indicated by the reference numeral 75 to the shoulder 76. By adjusting the cam members 67 and 68, it is possible to shorten or extend the cam surface 69. Any suitable means can be provided for securing the cam members 67 and 68 in their adjusted relation.

The motor 55 operates to drive the cam member thereof at a uniform rate. In the ordinary temperature control system, the speed of the motor and the reduction gear train 65 will be so chosen that the cam makes one complete revolution every twenty-four hours. So long as the cam follower of switch blade 57 is resting upon the cam surface 69, the switch blades 56 and 57 will be in engagement with contacts 58 and 60. As soon, however, as the cam is rotated sufficiently to allow the cam follower of the switch blade to ride off of the cam surface 69, switch blades 56 and 57 are moved, by reason of their bias, into engagement with contacts 59 and 61. As shown in the drawing, the system is designed to have switch blades 56 and 57 in engagement with contacts 58 and 60 during the daytime. Since this period is usually considerably longer than the portion of the day during which it is desired to maintain a lower temperature, the cam surface 69 extends considerably more than 180° around the periphery of the cam.

The relay coils 20 and 22 are connected to the secondary 40 of transformer 38 in series with protective resistances 43 and 44 through conductors 78 and 79. The protective resistances 43 and 44 are connected directly to the opposite terminals of the secondary 40 so that all the apparatus is connected in series with these resistances. The purpose of these resistances is to prevent a short circuit condition arising where the contact arms of two of the control potentiometers might be in opposite extreme positions.

The resistance 6 of the control potentiometer 5 is connected across the secondary 40 in series with protective resistances 43 and 44 through conductors 78, 80, 81, 85, 86 and 79. The contact arm 7 of the control potentiometer 5 is connected through bimetallic element 8 and conductors 82, 83 and 84 with the junction of relay coils 20 and 22. It will be readily apparent that the control potentiometer being connected in parallel with relay coils 20 and 22 acts to vary the relative voltage impressed upon the two relay coils. Any movement of the contact arm 7 to the right will decrease the voltage applied to relay coil 22 and increase the voltage across relay coil 20 and consequently decrease and increase, respectively, the energizations of these two coils. Similarly, a movement of contact arm 7 towards the left will increase the relative energization of relay coil 22 and decrease the relative energization of relay coil 20.

The rebalancing potentiometer 31 is likewise connected in parallel with relay coils 20 and 22. The right-hand end of the resistance 32 of the potentiometer 31 is connected through conductor 89 and protective resistance 44 with the right-hand terminal of secondary 40. The contact arm 33 is connected through conductor 90, rheostat 34 and conductors 91 and 84 to the junction of relay coils 20 and 22. The left-hand terminal of resistance 32 is connected through conductor 92 and protective resistance 43 with the left-hand end of secondary 40. It will readily be seen that the effect of a movement of contact arm 33 relative to resistance 32 is similar to that caused by a movement of contact arm 7 relative to resistance 60 of control potentiometer 5. If it were not for the impedance 34, the effect of which will be discussed in more detail later, a movement of contact arm 7 in one direction would demand a movement of contact arm 33 an equal amount in the opposite direction to rebalance the energization of the system.

The function of the time switch, as previously explained, is to connect one of the two potentiometers, 47 and 48, in parallel with control potentiometer 5. The effect of compensating potentiometers 47 and 48 is to introduce still another factor affecting the relative energization of relay coils 20 and 22. The common junction of resistances 49 and 51 of the two compensating potentiometers is connected, through conductor 94, with conductor 86 leading to the outer terminal of relay coil 20. The other terminals of resistances 49 and 51 are connected to contacts 60 and 61, respectively. The switch blade 57 associated with these contacts is connected, through conductor 95, with conductor 80 leading to the outer terminal of relay coil 22. Contacts 50 and 52 are connected with contacts 58 and 59, respectively, and the switch blade 56, which cooperates with these contacts, is connected, through conductor 96, with conductor 83 leading to the junction of coils 20 and 22. It will thus be seen that one end of the resistance of each potentiometer is permanently connected to one outside wire of the control potentiometer circuit, while the other leg and the slidable contact of each potentiometer are connected to the other outside wire and the center wire of the potentiometer circuit through connections controlled by the timing switch. It will further be readily seen that when the switch is in the position shown in the drawing, compensating potentiometer 48 is connected in parallel with control potentiometer 5, and that when the switches 56 and 57 are in the other position, compensating potentiometer 48 is effectively disconnected from the circuit and compensating potentiometer 47 is, in turn, connected with control potentiometer 5.

In order to more clearly understand the effect of the compensating potentiometers 47 and 48, the operation of the system will first be described as though these potentiometers were not employed and as if rheostat 34 were omitted. Under these conditions, the position of the valve shown in the drawing will permit a sufficient amount of heat to be supplied to the building to maintain the temperature at substantially a desired value. Were it not for the use of rheostat 34, the control potentiometer 5 would be initially calibrated so that when the temperature was at this desired normal value the contact arm 7 would be substantially in the midpoint of resistance 6. Assuming these conditions, a decrease in temperature below the desired value is effective to move contact arm 7 to the left of its midposition corresponding to the desired value. This results in the potential across relay coil 22 being increased relative to that across relay 20 causing the armature 23 to be drawn to the right. This, in turn, results in switch arm 24 being moved into engagement with contact 26. Upon this taking place, the following circuit is established to field winding 14 of the motor 10: from line wire 41 through conductor 98, switch arm 24, contact 26, conductor 99, limit switch 28, conductor 100, field winding 14 and conductor 101 to the other line wire 42. As previously pointed out, the energization of field winding 14 causes the motor 10 to operate in a direction such as to open valve 3. In other words, shaft 15 is rotated in a direction to effect clockwise rotation of crank disc 17. Thus the energization of field winding 14 as the result of the decrease in temperature causes valve 3 to be moved toward open position admitting more steam to radiator 1.

At the same time that the valve is being moved to open position by reason of rotation of shaft 15, the contact arm 33 is being moved to the right on resistance 32. The effect of moving contact arm 33 to the right is exactly the opposite to that caused by the movement of contact arm 7 to the left. The result is that after this movement of shaft 15 continues for a certain amount, the energization of relay coils 20 and 22 are again balanced, causing switch arm 24 to move out of engagement with contact 26.

It will be seen that for a given change in the temperature to which bimetallic element 8 is subjected, the valve 3 is moved a predetermined amount. The movement of the valve 3 which results from a given movement of contact arm 7 to the left is sufficiently great that the temperature in the space in which control 5 is located will begin to rise. The result is that contact arm 7 will move towards the right back towards the position which it occupies when the temperature is at its optimum value. As soon as contact arm 7 moves towards the right, relay coil 20 will become more highly energized than relay coil 22 causing armature 23 to move to the left. The latter action will cause switch arm 24 to move into engagement with contact 25, which results in the establishment of the following circuit to field winding 13 of motor 10: from line wire 41 through conductor 98, switch arm 24, contact 25, conductor 102, limit switch 29, conductor 103, field winding 13, and conductor 101 to the other line wire 42.

The energization of field winding 13 causes the motor to rotate in the opposite direction, driving the crank disc 17 in a counter-clockwise direction. The counter-clockwise rotation of crank disc 17 results in the valve 3 being moved toward closed position. At the same time, the contact arm 33 is moved toward the left. This movement will continue until contact arm 33 has moved sufficiently to the left to counteract for the movement to the right of contact arm 7 and again rebalance the relay. This constant unbalancing and rebalancing will result in the valve being continually adjusted until the temperature is again exactly at the optimum value.

Were it not for the rheostat 34, the effect of contact arm 33 would be substantially the same as that of contact arm 7. In other words, the movement of contact arm 33 entirely across resistance 32 would result only from a movement of contact arm 7 entirely across resistance 6. By reason of the insertion of rheostat 34 in the connection between the junction of relay coils 20 and 22 and contact arm 33, the effect of rebalancing potentiometer 31 is decreased. This, in turn, results in the effect of control potentiometer 5 being increased. By reason of the presence of rheostat 34, a comparatively small movement of the contact arm will require a rather large movement of contact 33 to rebalance the system and will accordingly require a rather large movement of valve 19 before the system is again at rest. The result is that the contact arm 7 operates only over a relatively short portion of resistance 6.

As previously stated, control potentiometer 51 is connected into the circuit during the day, which is the situation shown in the drawing. It will be noted that the contact 52 of control potentiometer 48 is considerably to the left of the center of resistance 51. The effect of this is to tend to increase the energization of relay coil 22 relative to relay coil 20 so that if contact arm 33 is to occupy the mid position shown in the drawing, it will be necessary for contact arm 7 to be considerably to the right of its mid position, or substantially in the position in which it is shown in the drawing. The instrument will be initially adjusted so that this position is the position which it occupies at the optimum value of the condition.

With compensating potentiometer 48 connected in the circuit in the manner just previously described, the control potentiometer operates over a range having at its mid point the point occupied by contact arm 7 in the drawing. Any deviation of the temperature from this value will result in a sufficient movement of the valve to cause the temperature to be gradually restored to the optimum value.

As soon as the timing motor 44 has driven the cam 71 to a point where the cam follower of switch blade 57 rotates off of the cam surface 69, switch blades 56 and 57 are moved out of engagement with contacts 58 and 60, respectively, and into engagement with contacts 59 and 61, respectively. When this takes place, which will be at a time when it is desired to lower the temperature maintained in the building, the compensating potentiometer 48 will be effectively disconnected from the circuit and compensating potentiometer 47 will be effectively connected in parallel with control potentiometer 5.

The contact 50 of control potentiometer 47 is adjusted so that it is considerably to the right of the mid point of resistatnce 46. Accordingly, if it were desired to maintain valve 19 in the same position as that shown in the drawing and consequently to maintain contact arm 33 in the center of resistance 32, it would be necessary for the contact arm 7 to be considerably to the left of the mid point of resistance 6, in order to compensate for the effect of potentiometer 47. While it is not desired to maintain valve 19 in exactly the same position as that occupied during the day, the position which it is necessary for it to assume to cause a lower temperature to be maintained in a room is sufficiently close to that occupied during the day that contact arm 7 will have to assume a position substantially corresponding to that shown in dotted lines in order for the system to be balanced. The result will be that contact arm 7 will operate over a range the mid point of which is that indicated in dotted lines in the drawing. In this new position of contact arm 7, the position at which valve 3 is maintained will be such that the reduced flow of steam to the radiators will just maintain the temperature at the desired lower value corresponding to the position of contact arm 7. Any deviation from this value will cause an action corresponding to that previously described.

It will accordingly be seen that the effect of interchanging the potentiometers 47 and 48 is to shift the control point of control potentiometer 5 and to accordingly shift the temperature maintained. This shifting of the control point of the thermostat is moreover accomplished without any physical adjustment of the thermostat itself and is performed entirely electrically. While in the illustrated form, two potentiometers are employed which are alternately connected in the circuit, it is to be understood that my invention is not so limited. The invention broadly contemplates the use of variable resistance means for varying the setting of a control system of this type to effect a change in the temperature maintained during certain periods. In particular, while there are shown two potentiometers, it is obvious that any other means for varying the effect of a potentiometer may be employed.

It will be readily seen that I have devised a highly effective and simple means for changing the temperature maintained by a temperature control system of the type wherein the regulating means of a temperature changing device is variably positioned in accordance with a controlling temperature. While I have described the control system in the form of a temperature control system, it is to be understood that certain features thereof are broadly applicable to any control system for a motor wherein the motor is variably positioned in accordance with the position of a control potentiometer. In general, while I have shown a specific embodiment of my devise, it is to be understood that it is for purposes of illustration only and that the invention is to be limited only by the scope of the appended claims.

I claim as my invention:

1. In a motor control system, a motor, a balanced relay controlling the same, said balanced relay comprising a pair of series connected coils, a source of electrical energy connected to the opposite ends of said coils, means controlling the relative energization of said relay coils comprising a control potentiometer and a rebalancing potentiometer, each of said potentiometers comprising a resistance and a contact slidably engaging the same, connections between the ends of said resistances and the opposite ends of said relay coils, further connections between the slidable contacts and the junction of said relay coils, impedance means in the connection between the slidable contact of said rebalancing potentiometer and the junction of said relay coils, said impedance means being operative to decrease the effect of said rebalancing potentiometer relative to said control potentiometer, means for periodically varying the effect of said control potentiometer, said last named means comprising a pair of compensating potentiometers, each comprising a resistance and a slidable contact, permanent connections between one end of the resistance of each of said compensating potentiometers and the corresponding end of the resistance of said control potentiometer, a pair of single-pole double-throw switches, timing means for simultaneously actuating said switches, separate connections between the opposite end of the resistance of each of said compensating potentiometers and the corresponding end of the resistance of said control potentiometer including one of said single-pole double-throw switches, and further separate connections between the slidable contact of each of said compensating potentiometers and the slidable contact of said control potentiometer including the other of said single-pole double-throw switches, said switches being so connected that when they are in one position one of said compensating potentiometers is connected in parallel with the control potentiometer and when in the other position, the other of said compensating potentiometers is connected in the circuit.

2. In a temperature control system for an enclosure, temperature changing means, regulating means therefor, means comprising electrical motor means for positioning said regulating means, a control potentiometer said control potentiometer comprising a relatively movable contact and resistance, temperature responsive means for varying the relative positions of said contact and resistance, means operatively connecting said control potentiometer to said motor and effective to cause said motor to position said regulating means in accordance with the relative positions of the contact and resistance of said control potentiometer, and means for automatically varying the setting of said control potentiometer to maintain different temperatures in said enclosure during different predetermined periods, said means comprising a plurality of differently adjusted compensating potentiometers, and means including a time switch for connecting a different one of said compensating potentiometers in parallel with said control potentiometer for each temperature to be maintained in said enclosure.

JOHN E. HAINES.